United States Patent
Vedrine et al.

(10) Patent No.: US 9,344,920 B2
(45) Date of Patent: May 17, 2016

(54) DEVICE AND METHOD FOR PERFORMING AN RSRVCC PROCEDURE

(71) Applicant: LG ELECTRONICS INC., Seoul (KR)

(72) Inventors: Arnaud Vedrine, Paris (FR); Saso Stojanovski, Paris (FR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/570,222

(22) Filed: Dec. 15, 2014

(65) Prior Publication Data

US 2015/0156677 A1    Jun. 4, 2015

Related U.S. Application Data

(63) Continuation of application No. 13/636,066, filed as application No. PCT/KR2011/002824 on Apr. 20, 2011, now Pat. No. 8,937,926.

(60) Provisional application No. 61/330,844, filed on May 3, 2010, provisional application No. 61/326,230, filed on Apr. 21, 2010.

(51) Int. Cl.
H04W 36/14    (2009.01)
H04W 36/00    (2009.01)
H04W 8/26    (2009.01)

(52) U.S. Cl.
CPC ...... *H04W 36/0016* (2013.01); *H04W 36/0022* (2013.01); *H04W 36/14* (2013.01); *H04W 8/26* (2013.01); *H04W 36/0066* (2013.01)

(58) Field of Classification Search
None
See application file for complete search history.

(56) References Cited

U.S. PATENT DOCUMENTS

| 2008/0043717 | A1 | 2/2008 | Bellora et al. |
| 2011/0173292 | A1* | 7/2011 | Patel et al. ............ 709/217 |
| 2011/0249652 | A1 | 10/2011 | Keller et al. |

FOREIGN PATENT DOCUMENTS

KR    10-2008-0086782 A    9/2008

* cited by examiner

*Primary Examiner* — Alex Skripnikov
(74) *Attorney, Agent, or Firm* — Dentons US LLP

(57) ABSTRACT

Method for performing an rSRVCC procedure from UTRAN/GERAN to E-UTRAN/HSPA, comprising steps of: —receiving, a first network entity, a first message from a UE before an rSRVCC handover procedure from URTAN/GERAN to F-E-UTRAN/HSPA involving the UE, the first message containing a pre-allocated transport address to be used for voice after the rSRVCC handover, —sending a second message, during the rSRVCC handover procedure of a voice call, to a second network entity, the second message comprising information related to the transport address of the UE to give an instruction to send the voice media of the call to that transport address.

9 Claims, 6 Drawing Sheets

US 9,344,920 B2

DEVICE AND METHOD FOR PERFORMING AN RSRVCC PROCEDURE

This application is a continuation of U.S. application Ser. No. 13/636,066, filed Sep. 19, 2012, which is a 35 U.S.C. §371 national stage entry of International Application No. PCT/KR2011/002824, filed on Apr. 20, 2011, and claims priority to U.S. Patent Nos. 61/326,230 and 61/330,844, filed Apr. 21, 2010 and May 3, 2010, respectively, the disclosures of which are incorporated by reference herein in their entireties.

TECHNICAL FIELD

The present invention generally relates to devices and methods for providing a network with the capability to perform an rSRVCC procedure to transfer a voice call established over UTRAN/GERAN network using the CS core network to E-UTRAN/HSPA network using the PS core network.

BACKGROUND ART

Single Radio Voice Call Continuity (SR-VCC) has been standardized since release 8 in 3GPP TS 21216 (version 9.3.0: Single Radio Voice Call Continuity (SRVCC); Stage 2) to provide continuity when a single radio capable User Equipment (UE) moves from E-UTRAN/HSPA (Evolved UMTS Terrestrial Radio Access Network/High Speed Packet Access) to UTRAN/GERAN (UMTS Terrestrial Radio Access Network/GSM EDGE Radio Access Network) while engaged in a voice call established over IP Multimedia Subsystem (IMS).

The SRVCC architecture has evolved since release 8, as a result of a study that has been performed in release 10 to enhance the performance of SRVCC from E-UTRAN/HSPA to UTRAN/GERAN in terms of voice break induced by the SRVCC handover procedure. The result of that study is documented in 3GPP TR 23.856 (version 10.0.0: Feasibility study of SR-VCC enhancements), and was introduced in the 3GPP release 10 specifications.

FIG. 1 and FIG. 2 describe the pre-release 10 Single Radio VCC solution, in the particular case of an SRVCC handover from E-UTRAN to GERAN without DTM support. A prerequisite is that the signalling for establishing the voice call over PS is routed through (or "anchored in") an AS in the IMS domain called the SCC AS.

The call flow in FIG. 1, which is an excerpt from 3GPP TS 23.216 version 9.1.0, is the uncoordinated execution of the following two procedures:
- IMS-level session transfer, initiated in step S710, and
- Completion of the radio-level handover preparation and handover execution (step S713 onward).

In step S701, the UE sends a measurement report to E-UTRAN.

In step S702, based on UE measurement reports, the source E UTRAN decides to trigger an SRVCC handover to GERAN.

In step S703, the source E UTRAN sends Handover Required (SRVCC HO Indication) message to the source MME. The SRVCC HO indication indicates to the MME that target is only CS capable, hence this is a SRVCC handover operation only towards the CS domain.

In step S704, based on the QCI associated with the voice bearer (QCI 1) and the SRVCC HO indication, the source MME splits the voice bearer from the non voice bearers and initiates the PS-CS handover procedure for the voice bearer only towards MSC Server.

In step S705, the MME sends a SRVCC PS to CS Request (STN-SR) message to the MSC Server. The MME received STN-SR from the HSS as part of the subscription profile downloaded during the E UTRAN attach procedure.

In step S706, the MSC Server interworks the PS-CS handover request with a CS inter MSC handover request by sending a Prepare Handover Request message to the target MSC.

In step S707, target MSC performs resource allocation with the target BSS by exchanging Handover Request/Acknowledge messages.

In step S708, target MSC sends a Prepare Handover Response message to the MSC Server.

In step S709, circuit connection is established between the target MSC and the MGW associated with the MSC Server e.g. using ISUP IAM and ACM messages.

In step S710, MSC Server initiates the Session Transfer by using the STN-SR e.g. by sending an ISUP IAM (STN-SR) message or a SIP INVITE (STN-SR) message towards the IMS.

In step S711, during the execution of the Session Transfer procedure the remote end is updated with the SDP of the CS access leg. The downlink flow of VoIP packets is switched towards the CS access leg at this point.

In step S712, the source IMS access leg is released as per TS 23.237.

It has to be noted that steps S711 and S712 are independent of step S713.

In step S713, the MSC Server sends a SRVCC PS to CS Response message to the source MME.

In step S714, the source MME sends a Handover Command message to the source E-UTRAN. The message includes information about the voice component only.

In step S715, the source E-UTRAN sends a Handover from E-UTRAN Command message to the UE.

In step S716, the UE tunes to GERAN.

In step S717, Handover Detection at the target BSS occurs. The UE sends a Handover Complete message via the target BSS to the target MSC.

As part of the session transfer procedure, the remote end is informed in step S711 that it shall now send the speech media to a new connection/port, which is the one that is hosted at the MGW.

Steps S710, S711 and S712 of FIG. 1 are further detailed in FIG. 2.

In steps S801 and S802, the SRVCC procedure specified in TS 23.216 results in an INVITE (STN-SR, SDP-MGW) message to be sent to the SCC AS with an STN-SR indicating use of SRVCC procedures for Access Transfer to CS access. The SDP-MGW parameter contains media flow description at the MGW. Steps S801 and S802 correspond to step 710 in FIG. 1.

In steps S803 and S804, the SCC AS uses the STN-SR to determine that Access Transfer using SRVCC is requested. The SCC AS is able to identify the correct anchored session. The SCC AS proceeds with the Access Transfer of the active session with bi-directional speech for the UE by updating the Remote Leg with the media description and other information using the Remote Leg Update procedure. Steps S803 and S804 correspond to step S711 in FIG. 1.

In step S805a, if the Gm reference point is retained upon PS handover procedure (which is typically the case when the target access is UTRAN), then:

In steps S805a-1 and S805a-2, the UE sends a Re-INVITE to the SCC AS via the PS access to update the remaining non-voice media flow(s) associated with the recently added active session. If the UE is using ICS capabilities, this Re-INVITE also adds Gm service control to the active session and the UE subsequently sends Re-INVITEs for any remaining inactive bi-directional speech sessions that are to be transferred.

In step S805a-3, the SCC AS processes the Re-INVITE(s) and updates the Remote Leg if needed. Step S805a has no corresponding step in FIG. 1, because FIG. 1 applies when the target access is GERAN with no DTM support, whereas step S805a would typically be performed when the target access is UTRAN.

In step S805b, if the Gm reference point is not retained upon PS handover procedure (which is typically the case where the target access is GERAN), or if there was no other non-voice media flow(s) in the IMS session than the voice which was transferred to the target access, then the Source Access Leg is released. Step S805b corresponds to step S712 in FIG. 1.

One thing which is important to note is that the signalling related to session transfer goes all the way down to the remote end, which increases the delay before the remote end switches the downlink media flow towards the MGW, and therefore creates a long voice break, especially in the case where one or both of the users involved in the call is/are roaming.

Therefore, a study was conducted in release 10 to investigate how to enhance the performance of SRVCC from E-UTRAN/HSPA to UTRAN/GERAN. The study is documented in 3GPP TS 23.856 (version 10.0.0: Feasibility study of SR-VCC enhancements).

Several architectures have been proposed for achieving that goal. One of them was based on utilizing the MSC/MGW as an anchor point for all calls, even the ones established on the PS side. FIG. 2 and FIG. 3 illustrate the basic principles of that solution.

FIG. 3 shows an example of a mobile originating call establishment.

In step S101, the UE transmits an INVITE message to a Serving Call State Control Function (S-CSCF).

In step S102, the S-CSCF, in response to the reception of the INVITE message, uses service logic with iFC.

In steps S103 and S104, the INVITE message is exchanged between the S-CSCF and a Service Centralization and Continuity Application Server (SCC AS).

In step S105, the S-CSCF sends the INVITE message to a function of the MSC, called Visited Access Transfer Functionality (VATF), which will anchor the call.

In step S106, a Media Gateway (MGW) is allocated.

In steps S107 to S109, the VATF initiates a new INVITE message which is routed back to the SCC AS, and to the remote party UE-2.

FIG. 4 is a high level illustration of what happens at SRVCC handover.

In step S201, the MSC receives an indication from the radio access network (RAN), and, in response to this indication, it starts sending to the target RNS/BSS.

In step S202, the MSC releases the source SIP access leg, which is the leg which goes from the UE, to the SCC AS down to the MSC/VATF (established through steps S1 to S5 in FIG. 1).

FIG. 5 illustrates another example of an SRVCC handover.

In steps S301 and S302, when the MSC receives an indication from the RAN, it sends an INVITE to the SCC AS indicating that the voice flow should now be sent towards the MGW.

In step S303, the SCC AS updates the Media Resource Function (MRF), either indicating it to bi-cast to the old transport address and the transport address of the MOW, or simply to switch and send to the address of the MGW.

In steps S304 and S305, the SCC AS sends a 200 OK message to the IMS, via the S-CSCF.

Step S305 further comprises operations S305a-1 and S305a-2 of sending a Re-INVITE message from the UE to the SCC AS, via the S-CSCF.

In case the MRF was instructed to bi-cast, that bi-casting is stopped either when an indicating is received that the UE has arrived on the target side (operation S305a-3) or when a timer expires (operation S305b-2).

Step S305 further comprises operation S305a-4 of updating remote leg and operation S305b-1 of releasing the source access leg.

Another alternative was finally selected for the specifications. It introduces two entities called ATCF and ATGW which act as anchor point for the signaling and the media respectively, and are located in the same network as the UE performing the SRVCC procedure. The ATCF controls the media resources of the ATGW.

While the call flow in FIG. 1 still applies in the case of the release 10 architecture, the IMS aspects of the SRVCC procedures now correspond to what is described in FIG. 6, which is an excerpt from 3GPP TS 23.237 version 10.4.1.

In step S1001, the UE, the RAN, the MME/SGSN and the MSC interact, as specified in TS 23.216.

The main difference between that flow and the flow of FIG. 2 is that the INVITE sent by the MSC server in step S1002 is sent to the ATCF instead of being sent to the SCC AS. The ATCF then reconfigures the ATGW in steps S1003 and S1004 so that the voice media from the remote end is sent towards the MGW, instead of being sent to the transport address of the UE on the source access. As shown in the figure, the remote end does therefore not see any difference between the situations before and after the SRVCC handover.

In the SRVCC specifications up to and including release 10, only the E-UTRAN/HSPA to UTRAN/GERAN direction is addressed. How to perform subsequent handovers in the reverse direction ("handback") was studied at the time SRVCC was first introduced (in 3GPP release 8), and a solution was proposed in 3GPP TS 23.216 version 1.1.0: (Single Radio Voice Call Continuity (SRVCC); Stage 2). But it then got subsequently removed from the specification as it was not deemed satisfactory.

Technical report 3GPP TR 23.885 (version 0.2.0: Feasibility study of SR-VCC for UTRAN/GERAN to E-UTRAN/HSPA service continuity) has been initiated in 3GPP release 10 and is pursued in 3GPP release 11. It aims at studying how the network could handover a single radio capable UE from UTRAN/GERAN to E-UTRAN, referred to as reverse SRVCC to E-UTRAN/HSPA, or rSRVCC in the following.

FIG. 7 represents steps of a method for performing an rSRVCC procedure according to the solution disclosed in TR 23.885 which is imported from version 1.1.0 of TS 23.216, in the particular case of handover from UTRAN or GERAN with Packet Switched (PS) handover support to E-UTRAN. It is based on the SRVCC pre-release 10 architecture.

That method can be decomposed in three parts: a handover preparation, a handover execution, and a voice re-establishment. A prerequisite is that the signalling for establishing the voice call over CS is routed (or "anchored") through the SCC AS.

Handover preparation part comprises steps S1 to S7.

In step S1, a source Radio Network Subsystem (RNS) decides to trigger a handover to E-UTRAN based on UE measurement reports.

In step S2, the source RNS initiates PS relocation.

Step S2 comprises an operation S2a of sending, from the source RNS, a Relocation Required (including a Source to Target Transparent Container) message to a source Serving GPRS Support Node (SGSN).

Step S2 comprises an operation S2b of sending, from the source SGSN, a Forward Relocation Request message to a target Mobility Management Entity (MME) including information about the non-voice component only.

In step S3, the source RNS initiates Circuit Switched (CS) relocation. Step S3 is performed in parallel to step S2.

Step S3 comprises an operation S3a of sending, from the source RNS, a Relocation Required (including the same Source to Target Transparent Container as in step S2a) message to the source Mobile Switching Centre (MSC).

Step S3 comprises an operation S3b of sending, from source MSC, a Prepare Subsequent HO Request to the MSC server.

Step S3 comprises an operation S3c of sending, from the MSC server, a Forward Relocation Request (Source to Target Transparent Container) message to the target MME.

In step S4, the target MME synchronises the two Forward Relocation Request messages and requests resource allocation for the non-voice component only by exchanging Handover Request/Acknowledge messages with the target E-UTRAN.

In step S5, the target MME acknowledges the prepared CS relocation towards the source access.

Step S5 comprises an operation S5a of sending, from the target MME, a Forward Relocation Response (including a Target to Source Transparent Container) message to the MSC Server.

Step S5 comprises an operation S5b of sending, from the MSC Server, a Prepare Subsequent HO Response to the source MSC.

Step S5 comprises an operation S5c of sending, from the source MSC, a Relocation Required Acknowledge (Target to Source Transparent Container) message to the source RNS.

In step S6, the target MME acknowledges the prepared PS relocation towards the source access. Step S6 is performed in parallel to step S5.

Step S6 comprises an operation S6a of sending, from the target MME, a Forward Relocation Response (including the same Target to Source Transparent Container as in step S5a) message to the source SGSN.

Step S6 comprises an operation S6b of sending, from the source SGSN, a Relocation Required Acknowledge (Target to Source Transparent Container) message to the source RNS.

In step S7, the source RNS synchronises the two Relocation Required Acknowledge messages and sends a Handover from UTRAN Command message to the UE.

From step S1 to step S7, the UE is on the source access side. The MSC and the SGSN interact with the MME. As no bearer is established for voice on the PS side (i.e. in the PGW-SGW) at this point, the MME only requests from the eNodeB radio resources for the existing PS bearers. The eNodeB allocates the proper radio resources, builds a RRC message ("RRC reconfiguration message"), which is then transported into the Target to Source transparent container from the eNodeB to the RNS on the source side via the MME and the MSC/SGSN.

Handover execution part comprises steps S8 to S11.

In step S8, UE re-tunes to E-UTRAN radio and sends a Handover to E-UTRAN Complete message to the E-UTRAN.

In step S9, the target E-UTRAN informs the target MME by sending a Handover Notify message.

In step S10, the target MME completes the CS relocation.

Step S10 comprises an operation S10a of sending, from the target MME, a Forward Relocation Complete message to the MSC Server. MSC Server acknowledges the information by sending a Forward Relocation Complete Acknowledge message to the source MME.

Step S10 comprises an operation S10b of sending, from the MSC Server, a Handover Complete message to the source MSC.

In step S11, the target MME completes the PS relocation. Step S11 is performed in parallel to step S10.

Step S11 comprises an operation S11a of exchanging, between the target MME and the source SGSN, Forward Relocation Complete/Acknowledge messages.

Step S11 further comprises an operation S11b of performing, at the target MME, the Modify hearer procedure with the Serving Gateway and the Packet Data Network Gateway (PDN GW). At this point the relocation of all non-voice PS bearers is completed and the user data are flowing across E-UTRAN access in both directions.

From step S8 onwards, the UE is on the target side. When it retunes to the target side, no bearer for voice exists. The voice call is therefore interrupted from that point on.

Voice re-establishment part comprises steps S12 to S15.

In step S12, UE performs a Tracking Area Update (TAU) procedure if required, e.g. due to UE mobility under UTRAN/GERAN coverage.

Subsequently, in step S13, UE initiates the Session Transfer procedure e.g. by sending a SIP INVITE (STI) message to the SCC AS. Standard IMS Service Continuity procedures are applied for execution of the Session Transfer, as described in 3GPP TS 23.237 (version 9.4.0: IP Multimedia Subsystem (IMS) Service Continuity; Stage 2). When receiving the INVITE from the UE, the SCC AS correlates it with the correct voice call, and initiates the update of the remote end with the Session Description Protocol (SDP) of this new EMS access leg. The downlink flow of VoIP packets is switched towards the PDN GW at this point.

In step S14, the IMS triggers a network-initiated dedicated bearer for the voice component.

In step S15, the IMS releases the CS access leg which result in release of resources in the MSC Server.

Voice can finally resume after step S15.

The main issue with this method is that it induces a long voice break at handover from UTRAN/GERAN to E-UTRAN/HSPA. A rough estimation would be that the break is of the order of a second, while the performance requirement set for the study is that the voice break should not exceed 300 ms.

Embodiments of the present invention aim at solving at least such issue. Namely, embodiments of the present invention will propose devices and methods for performing an rSRVCC procedure without inducing a long voice break at handover from GERAN/UTRAN to HSPA/E-UTRAN.

DISCLOSURE OF INVENTION

Solution to Problem

To address these needs, a first aspect of the present invention relates to a method for performing an rSRVCC procedure from UTRAN/GERAN to E-UTRAN/HSPA, comprising steps of:

receiving, at first network entity, a first message from a UE before an rSRVCC handover procedure from URTAN/GERAN to E-E-UTRAN/HSPA involving the UE, the first message containing a pre-allocated transport address to be used for voice after the rSRVCC handover, sending a second message, during the rSRVCC handover procedure of a voice call, to a second network entity, the second message comprising information related to the transport address of the UE to give an instruction to send the voice media of the call to that transport address.

The present invention may thus aim at reducing the interruption time due to rSRVCC handover, for example to less than 300 ms.

The first message may further contain information of codec the UE could use after the rSRVCC handover procedure of the voice call.

The method may further comprise a step of sending a third message to the second network entity, during the rSRVCC handover procedure, the third message comprising information related to the transport address of the UE to trigger the establishment of a PS voice bearer.

The first network entity may be an MSC server or an ATCF. The second network entity may be an ATGW or an SCC AS or ATCF.

The third message may be sent from a MSC server to a source SGSN/MME or to an ATCF. Alternatively, the third message may be sent from an ATCF to a PCRF.

The method may comprise a step of, during rSRVCC procedure, transmitting, from the source SGSN/MME, a Bearer Resource Command to the SGW/PGW before the transmission of a fourth message to a target SGSN/MME.

The method may comprise a step of receiving, at the first network entity, a fifth message including the information defining the PS voice bearer in the PS core network and a step of sending a sixth message, to the UE, including that information.

The information defining the PS voice bearer in the PS core network may include at least one of a TFT, an EPS bearer ID, a TI, and an EPS bearer QoS.

A second aspect of the present invention relates to a device comprising:

a processor configured to allocate, prior to an rSRVCC procedure from UTRAN/GERAN to E-UTRAN/HSPA involving the device, a transport address to be used for PS voice, a transmitting block configured to transmit information related to the transport address, and a receiving block configured to receive a message instructing the device to set-up a PS voice bearer and to move from the source access to the target access.

The received message may include at least one of a TFT, an EPS bearer ID, a TI, and an EPS bearer QoS.

The processor may be further configured to determine codec to be used after rSRVCC HO.

The information related to the transport address may be transmitted to an MSC server or to an IMS network.

BRIEF DESCRIPTION OF DRAWINGS

The present invention is illustrated by way of example, and not by way of limitation, in the figures of the accompanying drawings, in which same reference numerals refer to similar elements and in which.

MODE FOR THE INVENTION

Figure 1:
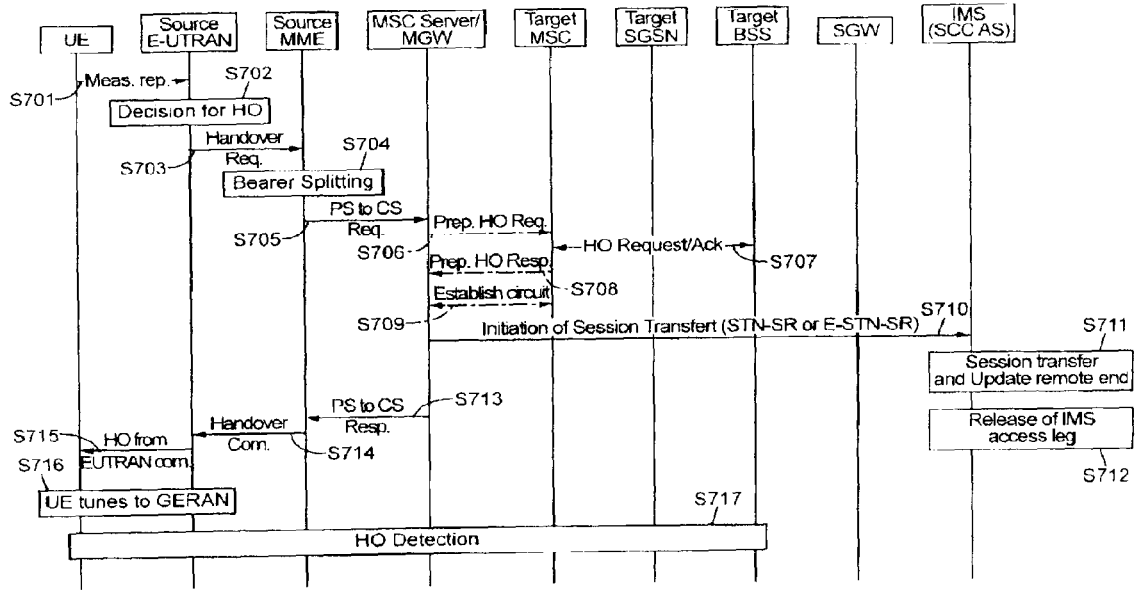
FIG. 1 is a schematic diagram showing an example of SRVCC procedure handover from E-UTRAN to GERAN without DTM support.
Figure 2:
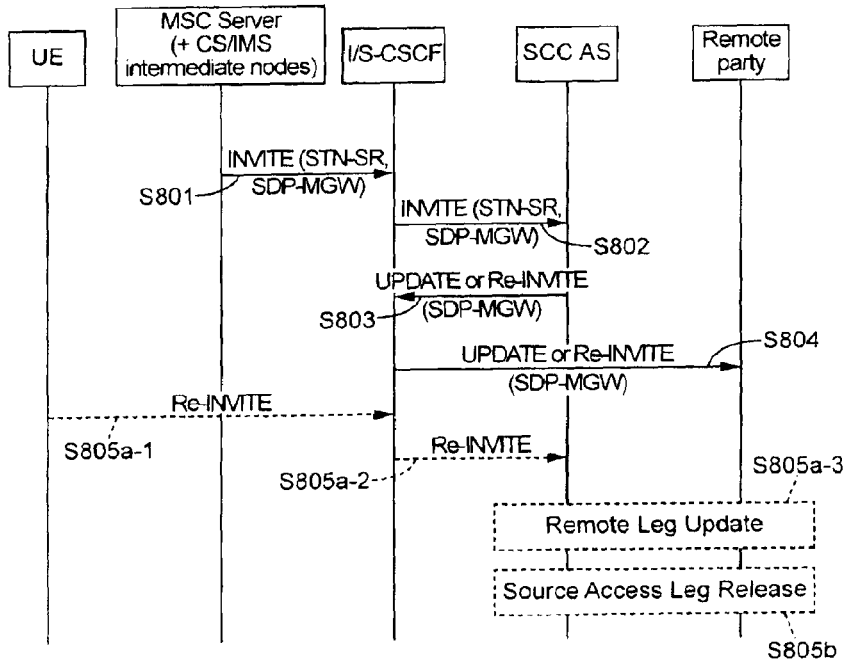
FIG. 2 is schematic diagram showing IMS aspects of the SRVCC procedure in release 9.
Figure 3:
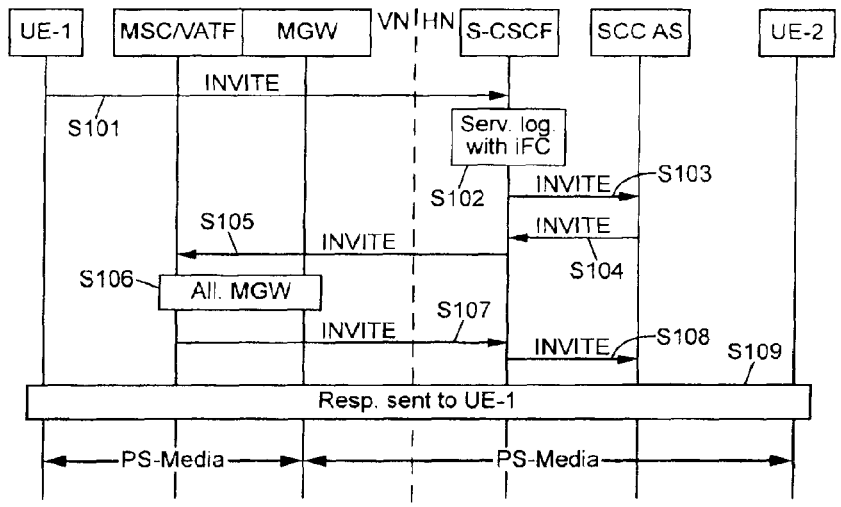
FIG. 3 is a schematic diagram showing an example of a mobile originating call establishment according to the solution described in TS 23.856.
Figure 4:
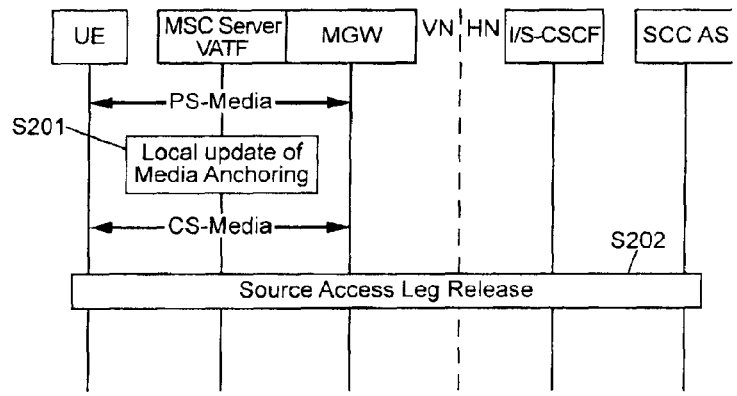
FIG. 4 is a schematic diagram showing an example of a SRVCC handover according to the solution described in TS 23.856.
Figure 5:
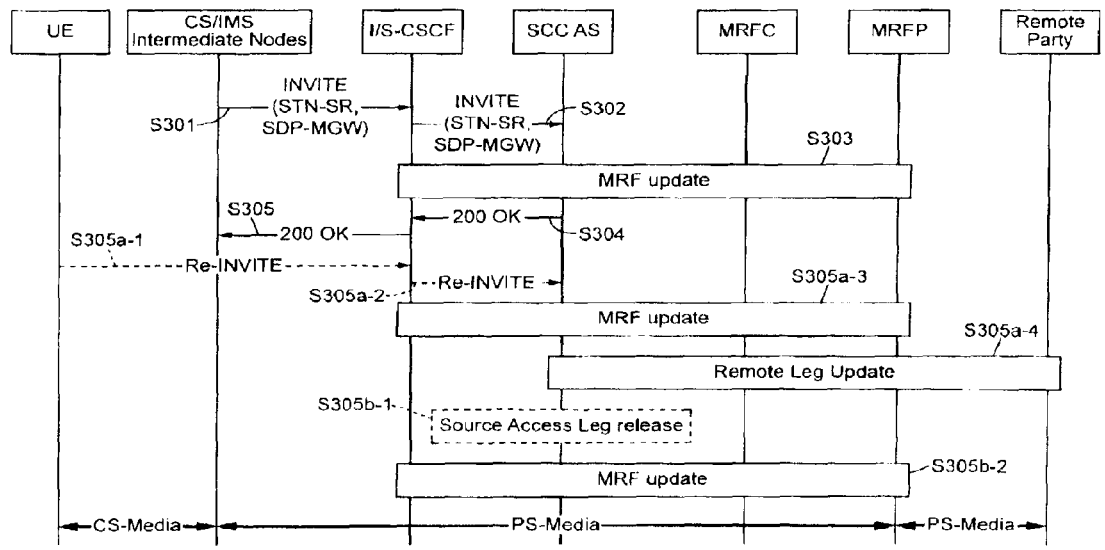
FIG. 5 is a schematic diagram showing another example of a SRVCC handover according to the solution described in TS 23.856.
Figure 6:
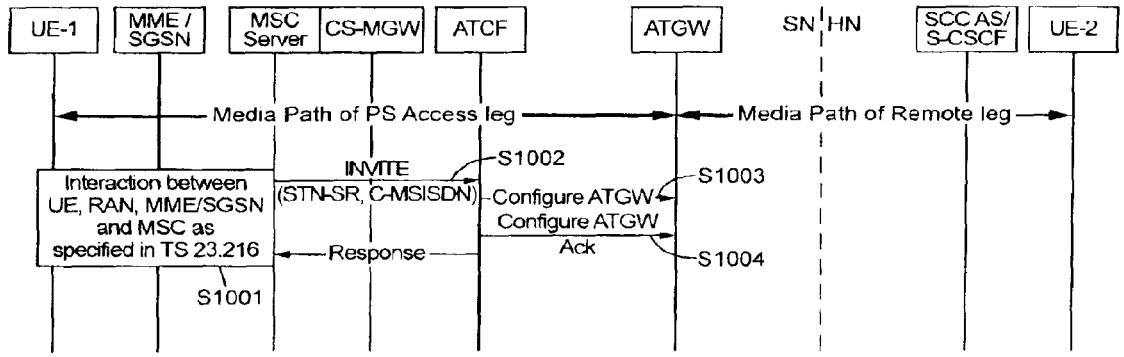
FIG. 6 is a schematic diagram showing IMS aspects of the SRVCC procedure in release 10.
Figure 7:
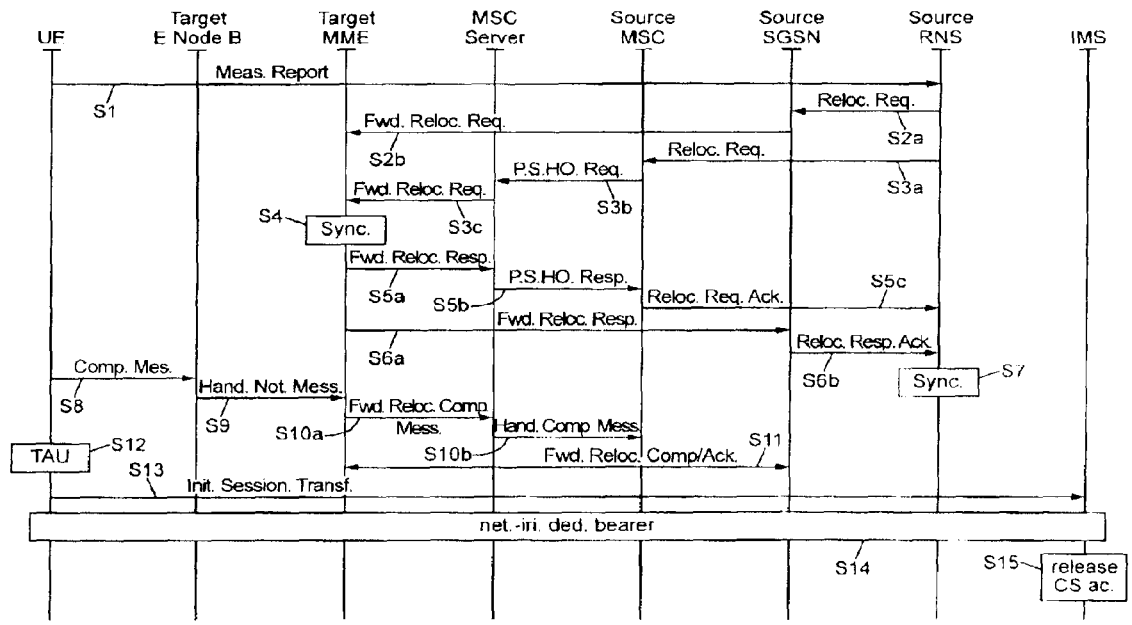
FIG. 7 is a schematic diagram showing steps of a method for performing a rSRVCC procedure according to the solution disclosed in TR 23.885.
Figure 8:
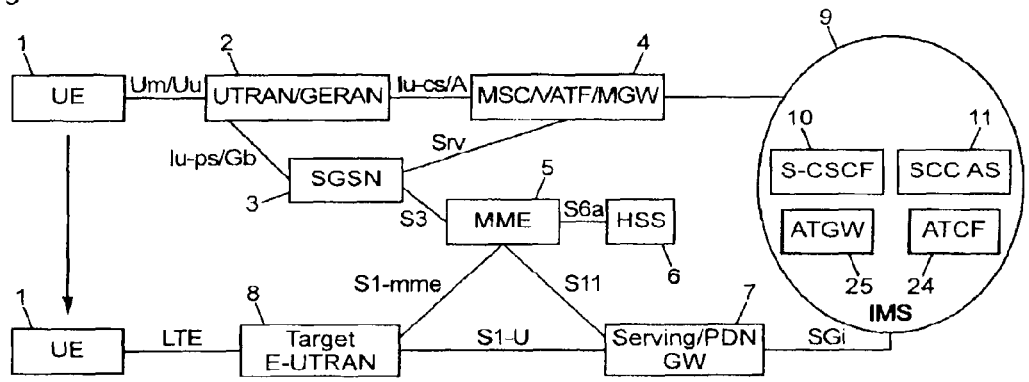
FIG. 8 is a schematic block diagram of a network architecture according to embodiments of the invention.

FIG. 8 represents a network architecture according to embodiments of the invention.

The network comprises, a UMTS Terrestrial Radio Access Network/GSM EDGE Radio Access Network (UTRAN/GERAN) 2, a Serving GPRS Support Node (SGSN) 3, a Mobile Switching Centre (MSC) server 4, a Mobility Management Entity (MME) 5, a Home Subscriber Server (HSS) 6, a Serving Gateway/Packet Data Network Gateway (SGW/PDN GW) 7, a target Evolved UMTS Terrestrial Radio Access Network (E-UTRAN) 8, and an IP Multimedia Subsystem (IMS) network 9. The IMS network 9 comprises a Serving Call State Control Function (S-CSCF) 10, a Service Centralization and Continuity Application Server (SCC AS) 11, an Access Transfer Control Function (ATCF) 24 and an Access Transfer Gateway (ATGW) 25.

Figure 8A:
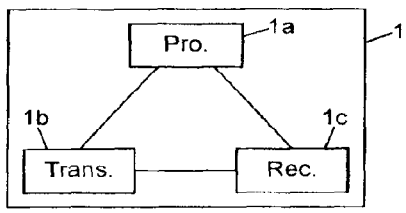
FIG. 8a is a schematic block diagram of a User Equipment according to embodiments of the invention.

The network further comprises a User Equipment (UE) 1 comprising a processor 1a (FIG. 8a) configured to allocate, prior to an rSRVCC procedure from UTRAN/GERAN to E-UTRAN/HSPA involving the UE 1, a transport address to be used for PS voice. The UE 1 further comprises a transmitting block 1b configured to transmit information related to the transport address. The UE 1 further comprises a receiving block 1c configured to receive a message instructing the UE to set-up a PS voice bearer and to move from the source access to the target access.

The MSC Server 4 may include a VATF functionality and may serve as a media anchor for voice calls in all cases, regardless of whether the access leg is established from the CS domain (i.e. the MSC) or PS domain (i.e. the SGSN).

A reference point Srv is disposed between the MSC 4 and the SGSN 3. This reference point Srv is used for reverse SRVCC handover preparation, as described further below.

During handover preparation for rSRVCC from GERAN/UTRAN to E-UTRAN/HSPA the network provides the UE 1 with essential Evolved Packet System (EPS) bearer information that allows the UE 1 to locally instantiate an EPS bearer for packet voice in parallel with the handover execution.

The essential EPS bearer information may comprise the following parameters: EPS bearer identifier (or NSAPI), QoS information and Traffic Filter Template (TFT) for the potential packet voice bearer on the target side.

Part of the essential EPS bearer information (notably, the UDP port numbers for packet voice, encoded in the TFT, that the UE 1 shall use on the target side in case of rSRVCC event) is pre-allocated by the UE 1 and provided to the network prior to the handover.

In the same way, the codecs that can be used by UE 1 after the handover are signalled to MSC 4. Alternatively, a predefined codec may be used.

During handover preparation the MSC 4 provides the SGSN 3 with transport address and bandwidth information for the packet voice access leg on the target side. The transport address information includes the information provided by UE 1 as well as information generated locally by the MSC 4. The bandwidth information is based on the selected codec.

As part of the handover preparation, the SGSN 3 triggers establishment of bearer context for the future EPS bearer that will be used to carry packet voice on the target side.

The complete essential EPS bearer information is provided to the UE 1 in a (RRC) Handover Command.

Figure 9:
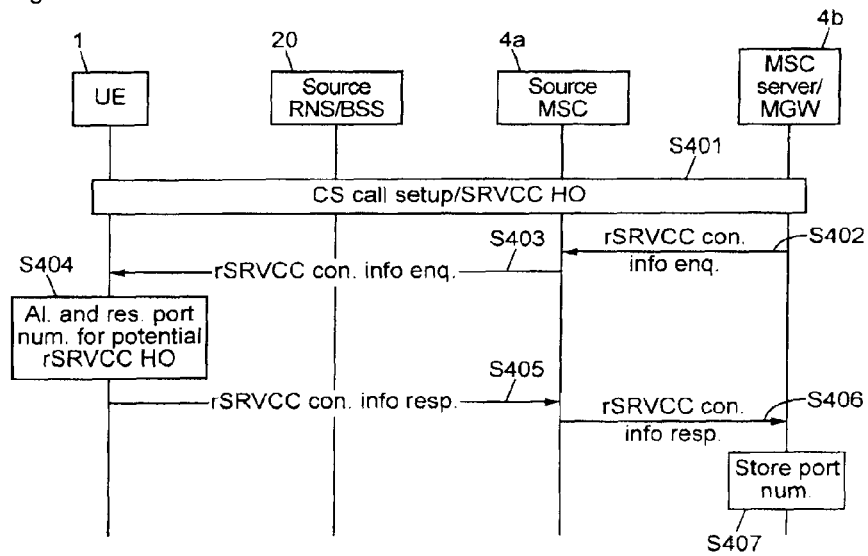
FIG. 9 is a schematic diagram showing steps of a rSRVCC handover according to embodiments of the invention.

Referring to FIG. 9, we are describing below steps of a rSRVCC handover according to embodiments of the invention.

In step S401, a CS call setup or an SRVCC from E-UTRAN/HSPA is performed, for which the MSC server 4b has determined that an rSRVCC could be possible later on.

In step S402, the MSC server 4b sends an rSRVCC connection info enquiry message. In some embodiments, the info enquiry message is replaced by an already existing message in which some information indicates that the intention of the MSC server 4b is to have the UE 1 reserve ports for a potential subsequent rSRVCC handover. The MSC 4b could also include a number of codecs that it could consider to use after such a handover.

In step S403, the rSRVCC connection info enquiry message is relayed if necessary, through the source MSC 4a that is connected to the BSS/RNS 20 serving the UE 1.

In step S404, when receiving the message, the UE 1 allocates UDP ports for the packet voice bearer on the E-UTRAN side in case of potential rSRVCC event. The UE 1 will reserve those ports until the voice call is terminated.

In step S405, the UE 1 answers by sending an rSRVCC connection info response to the MSC server 4b. The response includes the ports it has reserved for voice after a potential rSRVCC handover. It can also include the codec it prefers among the ones proposed by the MSC 4b if several were proposed in the request message received in step S403.

In step S406, the answer is relayed, if necessary, through the source MSC 4a that is connected to the BSS/RNS 20 serving the UE 1.

In step S407, the MSC 4b stores the ports reserved by the UE 1 for potential usage at rSRVCC handover.

Figure 10:
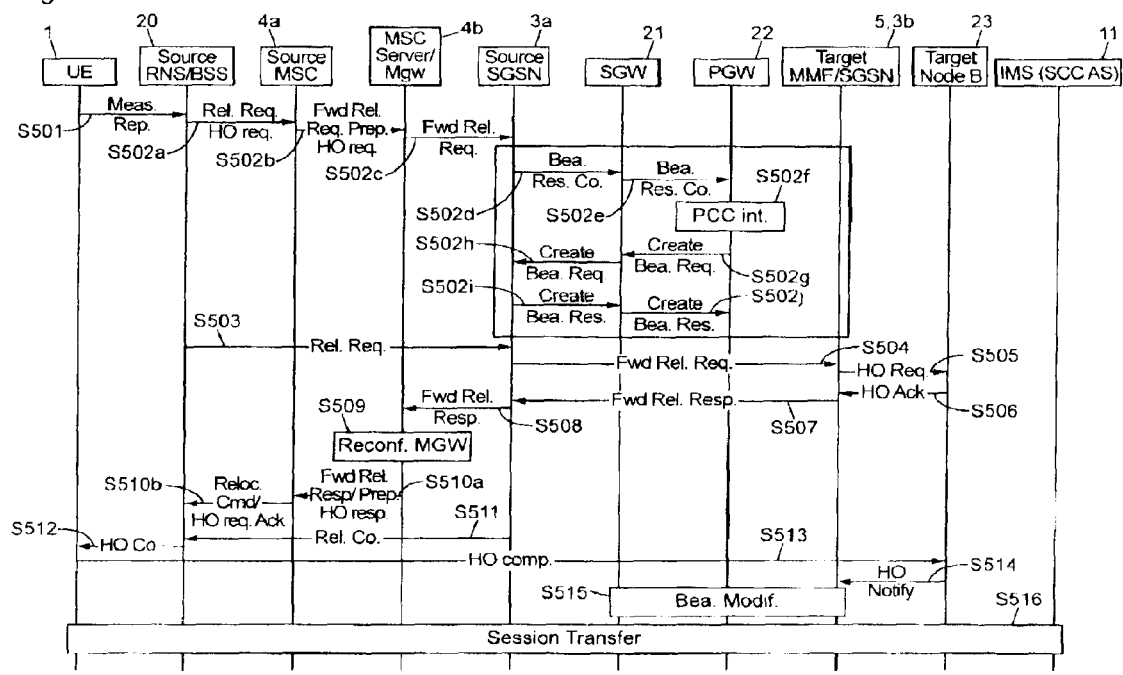
FIG. 10 is a schematic diagram showing in more details an example of a rSRVCC handover according to embodiments of the invention.

FIG. 10 represents a case where the serving MSC 4a (i.e. source MSC) is not the same as the anchor MSC 4b (i.e. MSC/MGW). In this case the VATF functionality is collocated with the MSC/MGW 4b.

In step S501, the UE 1 sends a measurement report indicating to the network that a VoIMS capable (either E-UTRAN or HSPA) cell has good quality.

Step S502 comprises operations S502a to S502j.

In operation S502a, the RNS/BSS 20 decides that an rSRVCC handover should take place. It therefore sends a Relocation Request message (case of the Iu interface), or a Handover Required message (in the case of the A interface) to the source MSC 4a. That message includes an indication that an rSRVCC handover is requested.

In operation S502b, in case the source MSC 4a is different from the anchor MSC 4b, the source MSC 4a forwards the request to the anchor MSC 4b, either in a Forward Relocation Request message or in a Prepare HO Request message.

In operation S502c, the MSC server 4b forwards the rSRVCC request message to the source SGSN 3a in a Forward Relocation Request message. That message includes the transport address provided by the UE 1, as well as the one that will be used by the MGW after the rSRVCC handover. It also includes information related to the pre-agreed codec for voice.

In operation S502d, when receiving that message, the SGSN 3a sends a Bearer Resource Command message to the SGW 21, to trigger the set up the PS voice bearer. The Traffic Aggregate Description (TAD) includes transport address information for both ends of the future packet voice access leg i.e. information provided by both UE 1 and MGW. The requested QoS corresponds to the QoS of a packet voice bearer and may take into account the codec information. An indication might be included that this is for later use, in case of rSRVCC.

In operation S502e, the SGW 21 forwards the Bearer Resource Command message to the PGW 22.

In operation S502f, the PGW 22 could interact with the PCRF in case dynamic PCC is deployed.

In operation S502g, the PGW 22 initiates (either based on the response of the PCRF in case of dynamic PCC, or as its own decision) the creation of the bearer, by sending a Create Bearer Request message to the SGW 21. The message includes the essential EPS bearer information i.e. the TFT (compiled from TAD information) and the QoS of the future EPS bearer supporting packet voice on E-UTRAN side, with the exception of the EPS Bearer ID/NSAPI, which is assigned later. The message may also include the IP address assigned to the UE 1 in order to cope with some cases when the SGSN 3a is not aware of it.

In operation S502h, the SGW 21 forwards the Create Bearer Request message to the Source SGSN 3a. The message includes the essential EPS bearer information, with the exception of the EPS Bearer ID/NSAPI, which is assigned later. The message may also include the IP address assigned to the UE 1 in order to cope with some cases when the SGSN 3a is not aware of it.

In operation S502i, the source SGSN 3a assigns the EPS Bearer ID/NSAPI for the future packet voice bearer, and replies with a Create Bearer Response message to the SGW 21. It does not request the RNS/BSS 20 to allocate any radio resources for that bearer.

In operation S502j, the SOW 21 sends a Create Bearer Response message to the POW 22, which finalizes the voice bearer creation.

In step S503, in case the PS bearers are not suspended (i.e. in the case of UTRAN or GERAN with DTM support), in parallel with operations S502a-S502j, the RNS/BSS 20 also sends a Relocation Request message to the SGSN 3a, indicating that an rSRVCC handover is requested.

In step S504, when operation S502i has occurred, the Source SGSN 3a sends a Forward Relocation Request message to the target MME/SGSN 5, 3b. The message includes bearer context for all bearers, including the future packet voice bearer.

In step S505 and S506, the target MME/SGSN 5, 3b requests the target eNodeB/NodeB 23 to allocate resources for all bearers (including the voice bearer). The Target eNodeB/Node B 23 answers. It includes in its answer a transparent container with the RRC message instructing the UE 1 to move to E-UTRAN/HSPA, using the proper radio resources. That container will be conveyed through the network down to the UE 1.

In step S507, the target MME/SGSN 5, 3*b* answers to the Source SGSN 3*a*, indicating that the resources have been allocated in the target eNodeB/Node B 23.

In step S508, the source SGSN 3*a* answers to MSC server 4*b* in a Fwd Relocation Response message indicating the success of the procedure. The essential EPS bearer information the UE 1 will use for voice after rSRVCC handover and UE's IP address is included in that message.

In step S509, when receiving that message, the MSC server 4*b* reconfigures the MGW. The MGW starts sending/receiving VoIP using for the UE 1 the UDP ports received from it earlier (refer to FIG. 9) or predefined ports, and the IP address received from the SGSN 3*a*. For the codec, it may either use the codec earlier signalled to the UE 1, or a predefined codec.

The source MSC 4*a* may in parallel continue sending voice samples to the source RNS/BSS 20.

In operations S510*a* and S510*b* of step S510, the MSC server 4*b* answers to the source MSC 4*a*, which then sends a Relocation Command message to the Source RNS/BSS 20. The messages include the essential EPS bearer information.

In step S511, in parallel with steps S508 to S510, the source SGSN 3*a* also sends a Relocation Command message to the source RNS/BSS 20. This step does not apply in the case of GERAN with no DTM support. The source SGSN 3*a* includes the NAS information related to the PS bearer established for voice (i.e. the essential EPS bearer information).

In step S511, when receiving the Relocation Command message from both the source MSC 4*a* and the SGSN 3*a* (except in the case of GERAN with no DTM support in which case only the answer from the MSC 4*a* is expected), the source BSS/RNS 20 sends a HO Command message to the UE 1.

That HO Command includes the NAS information related to the PS bearer established for voice (i.e. the essential EPS bearer information).

In step S513, the UE 1 retunes to the target access (E-UTRAN/HSPA). The UE sets up locally a PS voice bearer using the NAS information (i.e. the essential EPS bearer information) received from the network in the HO Command of step S512.

The UE 1 sends a HO Complete message to the target eNodeB/Node B 23. It starts sending and receiving voice using the PS voice bearer.

In step S514, when receiving that message from the UE 1, the target eNode B/Node B 23 sends a Handover Notify message to the target MME/SGSN 5*b*.

In step S515, the target MME/SGSN 5, 3*b* performs the bearer modification procedure towards the SGW/PGW 21, 22, effectively completing the EPS-level handover procedure.

In step S516, an IMS Session Transfer is triggered from the UE 1 to finalize the rSRVCC handover, by moving the session control to the PS leg. In case the MGW had been configured in step S509 to send to both the transport addresses exchanged during the rSRVCC handover pre-resource allocation, and to the RNS, when receiving the SIP signaling that indicates the session control transfer, the MSC 4*b* reconfigures the MOW to stop sending voice samples to the RNS 20 from that point on. Based on the IMS Session Transfer triggered from the UE 1, the P-CSCF will likely request the PCRF to establish a voice bearer, not being aware that the voice bearer has been already established. Note that the PCRF behaviour may need to be slightly adapted in order to be able to correlate the P-CSCF request for voice bearer with the bearer that was already requested from the SGSN 3*a* in operation S502*d*.

The invention thus enables rSRVCC from UTRAN/GERAN to E-UTRAN/HSPA, based on an architecture with media anchoring in the MSC/MGW.

Figure 11:
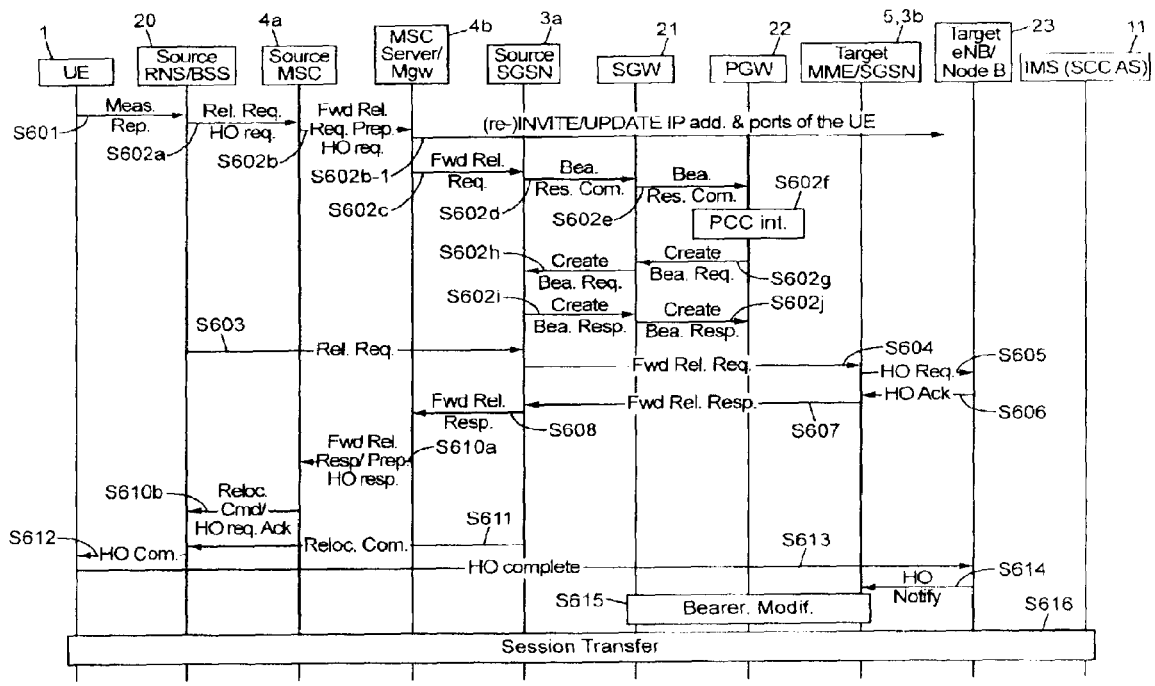
FIG. 11 is a schematic diagram showing an example of a rSRVCC handover according to other embodiments of the invention.

FIG. 11 represents an alternative embodiment of the method.

Step S601, Operation S602*a* and operation S602*b* correspond respectively to step S501, operation S502*a* and operation S502*b* described above.

Step S602 further comprises an operation S602*b*-1 of sending from the anchor MSC 4*b*, when getting such a request, a message towards the remote end (or the anchor point between the MGW and the remote end) indicating the voice should now be sent to the transport address of the UE 1 on the target access.

That request can routed to the remote end or the anchor point between the MSC 4*b* and the remote end either via the SCC AS 11 or by other means.

This request might include an indication that bi-casting to both the new transport address and to the old one is requested from the remote end (or from the anchor point between the MGW and the remote end).

Note that this assumes the MSC 4*b* has at this point the transport address of the UE 1. In case it would not have the IP address of the UE 1, and would need to receive it from the SGSN 3*a*, this step could instead take place after receiving the response message from the SGSN 3*a* in step S608.

In operation S602*c*, in parallel with operation S602*b*-1, the MSC 4*b* forwards the rSRVCC request to the source SGSN 3*a* in a Forward Relocation Request message.

That message includes the transport address provided by the UE 1 (which will be used after the rSRVCC handover), as well as the one that is used by the remote end (or an anchor point between the MGW and the remote end), and which is known by the MSC 4*b* as this is the destination address of the voice packets sent by the MGW. It also includes information related to the pre-agreed codec for voice.

Operations S602*d* to S602*j* correspond respectively to operations S502*d* to S502*j* described above. In the same way, steps S603 to S608 and S610*a* to S614 correspond respectively to steps S503 to S508 and S510*a* to S514.

In step S615, in case the remote end had been requested to bi-cast in operation S602*b*-1, when receiving the signaling corresponding to the session control transfer, it shall stop bi-casting.

We are describing below embodiments of the invention, in which the MSC 4 is assumed to support the I2 interface and to be able to register on behalf of the UE 1, as does an MSC enhanced for ICS and the CS voice calls that might be subject to rSRVCC are assumed to have been routed through the ATCF 24.

When the rSRVCC handover should take place, the MSC 4 triggers the SGSN/MME 3, 5 either directly or via the ATCF 24 to setup the PS bearer for voice.

At the same time or once the bearer is established, the MSC 4 sends a re-INVITE message to the ATCF 24 indicating to it to switch sending the media to the ports & IP address of the UE 1. That INVITE message is either sent down to the remote end, or consumed locally by the ATCF 24 (which then instructs the ATGW 25 to switch sending the media to the new address), or by an anchor point between ATCF 24 and the remote end.

Figure 12:
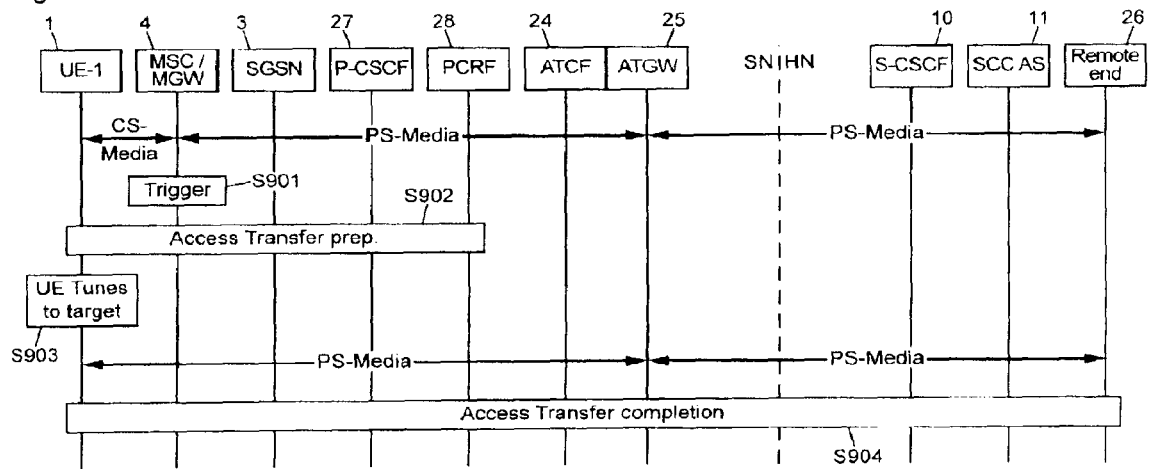
FIG. 12 is a schematic diagram showing an example of CS-PS access transfer according to embodiments of the invention.
Figure 13:
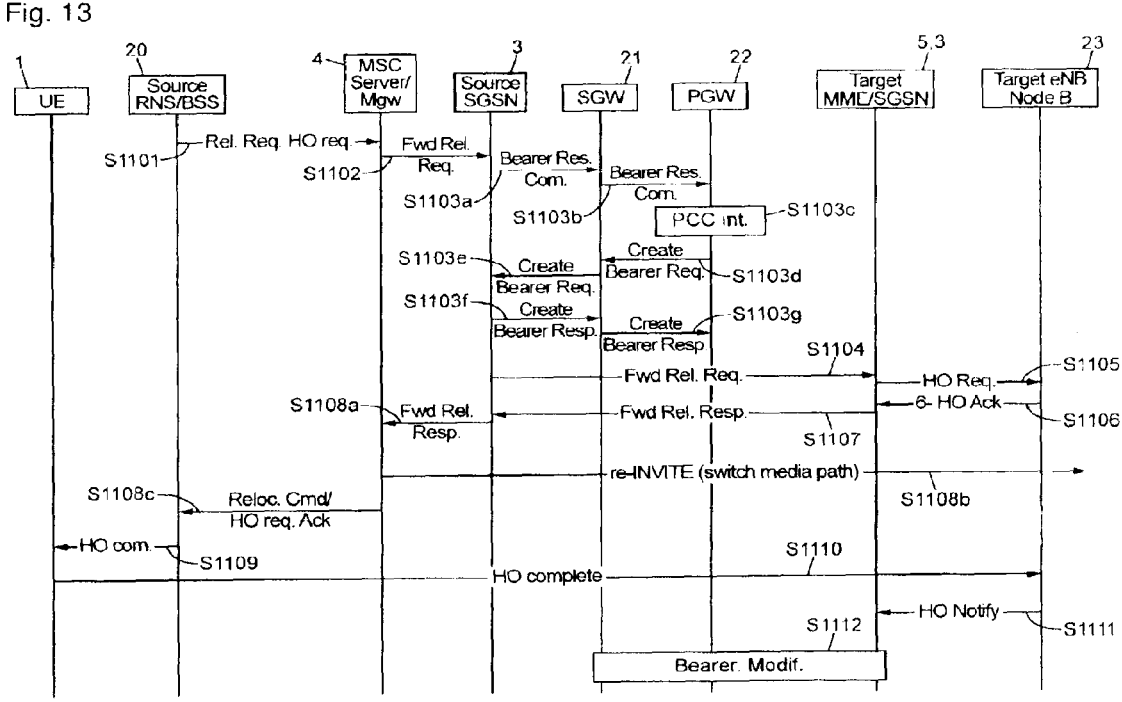
FIG. 13 is a schematic diagram showing an example of an access transfer preparation according to other embodiments of the invention.

Features of the example embodiments represented in FIG. 12 to FIG. 13 may be used in combination with the embodiments described above.

FIG. 12 represents an example of CS-PS access transfer. It is assumed that the media has been anchored in the ATGW 25 at call set up.

In step S901, the MSC server 4 receives the trigger to initiate the access transfer.

In step S902, access transfer preparation is performed.

In step S903, the UE 1 tunes to target radio access. UE 1 sends and receives voice media over PS.

In step S904, the access transfer is completed by moving the session control to the PS access leg.

FIG. 13 represents an alternative of access transfer preparation. In this alternative, the source SGSN initiates the voice bearer setup.

In step S1101, the RNS/BSS 20 decides that an rSRVCC handover should take place. It therefore sends a Relocation Required message (case of the Iu interface), or a Handover Required message (in the case of the A interface) to the source MSC 4. That message includes an indication that an rSRVCC handover is requested.

In step S1102, the anchor MSC 4 forwards the rSRVCC request to the source SGSN 3 in a Forward Relocation Request message. That message includes the transport address provided by the UE 1, as well as the address it is sending voice media to (e.g. the transport address of the ATGW or of the remote end). It also includes information related to the codec to be used for voice.

Step S1103 comprises operations S1103a to S1103g.

In operation S1103a, when receiving that message, the SGSN 3 sends a Bearer Resource Command message to the SGW 21, to trigger the set up the PS voice bearer. The Traffic Aggregate Description (TAD) includes transport address information for both ends of the future packet voice access leg i.e. information provided by both UE 1 and MGW 4. The requested QoS corresponds to the QoS of a packet voice bearer and may take into account the codec information.

In operation S1103b, the SGW 21 forwards the Bearer Resource Command to the PGW 22.

In operation S1103c, the PGW 22 interacts with the PCRF in case dynamic PCC is deployed.

In operation S1103d, the PGW 22 initiates (either based on the response of the PCRF in case of dynamic PCC, or as its own decision) the creation of the bearer, by sending a Create Bearer Request to the SGW 21. The message includes the essential EPS bearer information i.e. the TFT (compiled from TAD information) and the QoS of the future EPS bearer supporting packet voice on E-UTRAN side, with the exception of the EPS Bearer ID/NSAPI, which is assigned later. The message may also include the IP address assigned to the UE 1 in order to cope with some cases when the SGSN 3 is not aware of it.

In operation S1103e, the SGW 21 forwards the Create Bearer Request to the Source SGSN 3. The message includes the essential EPS bearer information, with the exception of the EPS Bearer ID/NSAPI, which is assigned later. The message may also include the IP address assigned to the UE 1 in order to cope with some cases when the SGSN 3 is not aware of it.

In operation S1103f, the source SGSN 3 assigns the EPS Bearer ID/NSAPI for the future packet voice bearer, and replies with a Create Bearer Response to the SGW 21. It does not request the RNS/BSS 20 to allocate any radio resources for that bearer.

In operation S1103g, the SGW 21 sends a Create Bearer Response to the PGW 22, which finalizes the voice bearer creation.

In step S1104, when operation S1103f has occurred, the source SGSN 3 sends a Forward Relocation Request to the target MME/SGSN 5, 3. The message includes bearer context for all bearers, including the future packet voice bearer.

In steps S1105 and S1106, the target MME/SGSN 5, 3 requests the target eNodeB/NodeB 23 to allocate resources for all bearers (including the voice bearer). The target eNode B/Node B 23 answers, including the transparent container destined to the UE 1.

In step S1107, the target MME/SGSN 5, 3 answers to the source SGSN 3, indicating that the resources have been allocated in the target eNodeB/Node B 23.

Step S1108 comprises operations S1108a to S1108c.

In operation S1108a, the source SGSN 3 answers to source MSC 4 in a Fwd Relocation Response message indicating the success of the procedure. The essential EPS bearer information the UE 1 will use for voice after rSRVCC handover and UE's IP address is included in that message.

In operation S1108b, when receiving that message, the MSC 4 sends a re-INVITE to have the media path switched to the transport address of the UE 1 on the target access. That operation could also occur anytime after step S1102.

In operation S1108c, the MSC 4 sends a Relocation Command to the source RNS/BSS 20.

In step S1109, when receiving the Relocation Command from the source MSC 4, the source BSS/RNS 20 sends a HO Command to the UE 1. That HO Command includes the NAS information related to the PS bearer established for voice.

In step S1110, the UE 1 retunes to the target access (E-UTRAN/HSPA). The UE 1 sets up locally a PS voice bearer using the NAS information received from the network in the HO Command. The UE 1 sends a HO Complete message to the target eNodeB/NodeB 23. It starts sending and receiving voice using the PS voice bearer.

In step S1111, when receiving that message from the UE 1, the target eNodeB/Node B 23 sends a Handover Notify to the target MME/SGSN 5, 3.

In step S1112, the target MME/SGSN 5, 3 performs the bearer modification procedure towards the SGW/PGW, effectively completing the EPS-level handover procedure.

The access transfer completion may be accomplished e.g. by sending a SIP INVITE to the ATCF or to the SCC AS (in case no ATCF has been involved in the call establishment). The ATCF is addressed using a static or provided STI-rSR (Session Transfer Identifier for rSRVCC). If the ATCF was involved and receives such an INVITE, it notifies the SCC AS about the fact the UE has now moved to the target access.

While there has been illustrated and described what are presently considered to be preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the invention as broadly defined above.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in a reference to the plural and vice versa.

A person skilled in the art will readily appreciate that various parameters disclosed in the description may be modified and that various embodiments disclosed may be combined without departing from the scope of the invention.

The invention claimed is:

1. A method for supporting a reverse Single Radio Voice Call Continuity (rSRVCC), comprising:
   receiving, by a first network entity from a user equipment (UE), a first message including codec information and port information the UE prefers to use for an rSRVCC access transfer; and
   transmitting, by the first network entity to a second network entity, a second message including the codec information and the port information the UE prefers to use for the potential rSRVCC access transfer,
   wherein the rSRVCC involves a first handover for the UE from a Universal Terrestrial Radio Access Network (UTRAN) or GSM EDGE Radio Access Network (GERAN) to an Evolved UTRAN (E UTRAN), and
   wherein the first network entity is a Mobile Switching Center (MSC) server or an Access Transfer Control Function (ATCF).

2. The method according to claim 1, wherein the rSRVCC further involves a second handover for the UE from a Universal Terrestrial Radio Access Network (UTRAN) or GSM EDGE Radio Access Network (GERAN) to High Speed Packet Access (HSPA).

3. The method according to claim 1, further comprising:
   transmitting, by the first network entity to the second network entity, a third message including information related to transport address information of the UE to trigger an establishment of a Packet Switched (PS) voice bearer.

4. The method according to claim 3, wherein, when the first network entity is the MSC server, the third message is transmitted to a source Serving GPRS Support Node (SGSN)/Mobility Management Entity (MME).

5. The method according to claim 3, wherein, when the first network entity is the ATCF, the third message is transmitted to a Policy and charging rules function (PCRF).

6. The method according to claim 5, wherein during rSRVCC procedure, a Bearer Resource Command is transmitted from a source SGSN/MME, to a SGW/PGW before the transmission of a fourth message to a target SGSN/MME.

7. The method according to claim 1, wherein the second network entity is an Access Transfer Gateway, or a Service Centralization and Continuity Application Server (SCC AS), or an ATCF.

8. The method according to claim 7, wherein information defining a PS voice bearer in a PS core network is forwarded to the UE by the first network entity.

9. The method according to claim 8, wherein the information defining the PS voice bearer in the PS core network includes at least one of a Traffic Filter Template (TFT), an Evolved Packet System (EPS) bearer ID, a TI, and an EPS bearer Quality of Service (QoS).

* * * * *